United States Patent
Buchheit et al.

[11] Patent Number: 5,429,407
[45] Date of Patent: Jul. 4, 1995

[54] SUN VISOR FOR VEHICLES WITH INTEGRATED MIRROR FRAME

[75] Inventors: Christian Buchheit, Ham Sous Vasberg; René Lecorvaisier, Hombourg-Haut, both of France

[73] Assignee: Gebr. Happich GmbH, Wuppertal, Germany

[21] Appl. No.: 172,037

[22] Filed: Dec. 22, 1993

[30] Foreign Application Priority Data

Jan. 30, 1993 [DE] Germany ............ 43 02 607.9

[51] Int. Cl.⁶ .............................................. B60J 3/00
[52] U.S. Cl. .............................................. 296/97.2
[58] Field of Search ................. 296/97.1, 97.5, 97.2

[56] References Cited

U.S. PATENT DOCUMENTS

| | | | |
|---|---|---|---|
| 4,353,592 | 10/1982 | Cziptschirsch | 296/97.5 |
| 4,364,597 | 12/1982 | Viertel et al. | 296/97.5 |
| 4,378,129 | 3/1983 | Kaiser et al. | 296/97.5 |
| 4,518,192 | 5/1985 | Canadas et al. | 296/97.5 |
| 4,564,234 | 1/1986 | Kaiser et al. | 296/97.5 |
| 4,711,483 | 12/1987 | Gulette et al. | 296/97.5 |
| 4,773,699 | 9/1988 | Cebollero | 296/97.5 X |
| 5,160,203 | 11/1992 | Viertel et al. | 296/97.5 X |
| 5,209,880 | 5/1993 | Miwa | 296/97.1 X |
| 5,308,137 | 5/1994 | Viertel et al. | 296/97.1 |

FOREIGN PATENT DOCUMENTS

| | | |
|---|---|---|
| 0036448 | 12/1980 | European Pat. Off. |
| 0314652 | 10/1987 | European Pat. Off. |
| 0503150 | 9/1992 | European Pat. Off. |
| 2278228 | 7/1974 | France |
| 1068571 | 11/1959 | Germany ............ 296/97.5 |
| 2102917 | 1/1971 | Germany |
| 7614171 | 9/1976 | Germany |
| 2619844 | 11/1977 | Germany ............ 296/97.5 |
| 2742318 | 3/1978 | Germany ............ 296/97.5 |
| 2738262 | 4/1978 | Germany ............ 296/97.5 |
| 8201176 | 1/1982 | Germany |
| 3706092 | 2/1987 | Germany |
| 3900870 | 1/1989 | Germany |
| 3909687 | 3/1989 | Germany |
| 4023243 | 7/1990 | Germany |
| 9110948 | 9/1991 | Germany |
| 1327985 | 1/1971 | United Kingdom |
| 1475020 | 7/1974 | United Kingdom |

OTHER PUBLICATIONS

Ceramic abstracts, vol. 18, No. 9, Journal of the American Ceramic Society, Sep., 1939.

*Primary Examiner*—Joseph Pape
*Attorney, Agent, or Firm*—Ostrolenk, Faber, Gerb & Soffen

[57] ABSTRACT

A sun visor body for a vehicle is comprised of polypropylene particle foam, having a depression on one broad side into which a mirror which is held by a frame is inserted. The frame is an injection molding comprised of polypropylene. The free end region or edge of the insertable web of the frame is integrally fused to the bottom of the depression in the sun visor body due to initial heating of the free end region. The resulting deformation of the web also securely holds the edge of the mirror.

19 Claims, 1 Drawing Sheet

SUN VISOR FOR VEHICLES WITH INTEGRATED MIRROR FRAME

BACKGROUND OF THE INVENTION

The present invention relates to a sun visor for vehicles having a sun visor body, particularly formed of polypropylene particle foam, and having a depression on one broad side into which a mirror, which is held by a frame, is inserted.

It is generally known to arrange a mirror on the body of a sun visor. Various systems are used to attach the mirror on the sun visor body. For example, the mirror frame is frequently sealed to a wrapping which surrounds the sun visor body. This method is expensive. In another conventional attachment system, the sun visor body has locally formed in inserts with attachments for the gripping, bolting or clipping of holding elements arranged on the mirror frame. This method has the disadvantage of expensive manufacture.

SUMMARY OF THE INVENTION

An object of the present invention is to develop a sun visor of the above mentioned type such that expensive attachments and manipulations, as well as the need for additional insert elements in the sun visor body, can be avoided. Furthermore, rational and cost favorable manufacture are made possible, as well as simplified recycling.

For achieving these objects, the invention concerns a sun visor for vehicles having a sun visor body which is comprised of polypropylene particle foam. The body has a depression formed in one broad side of the body into which a mirror is inserted. The mirror is held by a frame and the frame is developed as an injection molding comprised of polypropylene. According to the invention, the frame is integrally connected to, and particularly fused to the sun visor body. This is accomplished by heating at least the part of the frame in, and particularly at the bottom of, the depression and inserting it while heated and deformable so that the polypropylene material of the frame fuses to the polypropylene material of the body.

It is preferable that the frame have a circumferential flange which rests on the sun visor body outside the depression and that the frame also have a circumferential web which extends approximately perpendicular to the flange and into the depression in the visor body. The web has partial circumference or spaced apart, short circumferential length, short height web extensions which, after prior heating and resultant softening, as well as near melting, are pressed into the bottom of the depression and are fused with the material of the sun visor body.

To manufacture the sun visor according to the invention, a sun visor body is formed in a conventional manner, and a mirror frame is separately injection molded in a conventional manner but using a special material which fuses with the foam material of the visor body. After a possible step of covering the sun visor body with a wrapping material, it is merely necessary to press the mirror frame, which has been equipped with the mirror, into the depression provided for the frame in the sun visor body.

However, before pressing the mirror frame into the depression and in order to produce an integral fused connection of the frame with the material of the sun visor body, it is necessary to heat and partially soften the frame web material, up to incipient melting. The spaced apart web extensions are heated correspondingly, for instance, by means of a sealing mandrel or other heat applicator. Due to pressing the mirror frame into the visor body depression, the web extensions penetrate into the material of the sun visor body fusing them together and producing an undetachable connection. As shown by tests, the integral connection that is produced in this manner can, in some embodiments at least, only be dissolved by the destruction of the material.

In a further development of the invention, in its free end region or free edge, the web may have a circumferential, step shaped shoulder against which the mirror rests. The mirror is then fixed to the frame by the partial displacement of the material of the free web edge toward and around the rear edge of the mirror. Such displacement is produced by feeding heat and pressure to the free end region of the web. The displacement of the material can be effected rapidly and without any problems, for instance, by means of a heated mandrel or heatable reflective mirror and this leads to reliable attachment of that reflective mirror on the mirror frame.

Other features and advantages of the present invention will become apparent from the following description of the invention which refers to the accompanying drawings.

DETAILED DESCRIPTION OF THE INVENTION

Figure 1:
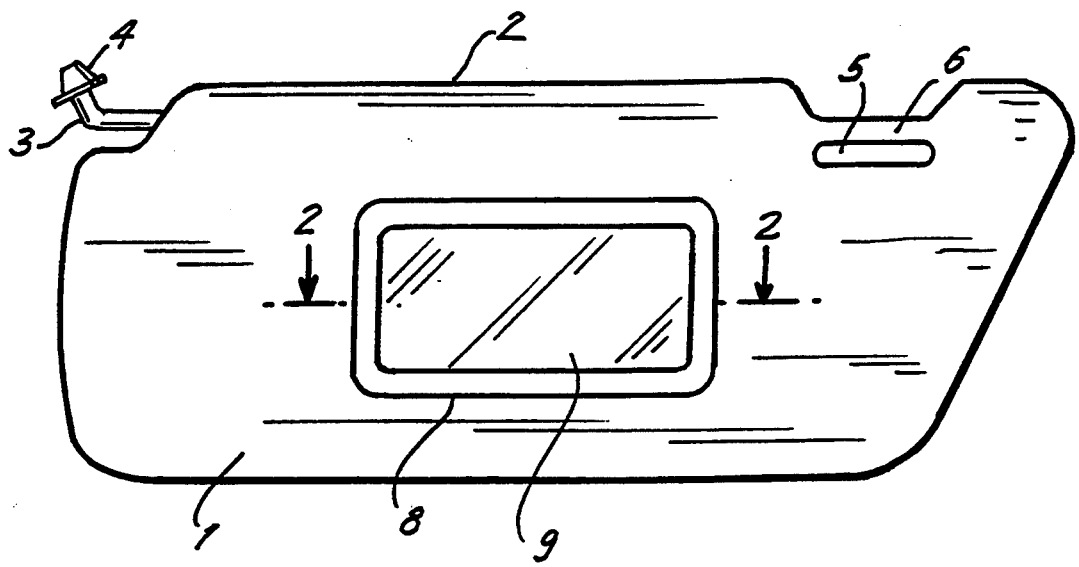
FIG. 1 shows a sun visor in its position of use.

The sun visor comprises a sun visor body 1 having an upper longitudinal edge region 2 in which a sun visor shaft 3 is embedded, as shown on the left side of FIG. 1. The sun visor shaft 3 is mounted at its other end in a small bearing block 4, which can be attached to the vehicle body. On the right side of FIG. 1, the sun visor body 1 has an abutment pin 6 which passes through an opening 5 and which can engage in detachable manner into another small abutment block, not shown.

The sun visor body 1 is formed of polypropylene particle foam. The body has on one broad side a depression 7 into which a mirror 9, mounted in a frame 8, is inserted. The frame 8 is an injection molding formed of polypropylene material, preferably essentially the same material as the foam visor body, so that, like the sun visor body, the frame can be fully recycled.

The frame 8 has a circumferential flange 10 which rests on top of the sun visor body 1 around the border of the depression. The frame includes a circumferential web 11 which extends approximately perpendicular to the flange 10 and engages the foam body in the depression 7. The web 11 has short height web extensions 12 at spaced intervals around its free web edge. The web extensions 12 are shown in the sectional view of FIG. 2 and can be more clearly seen in the side view of the frame 8 of FIG. 3.

Figure 2:
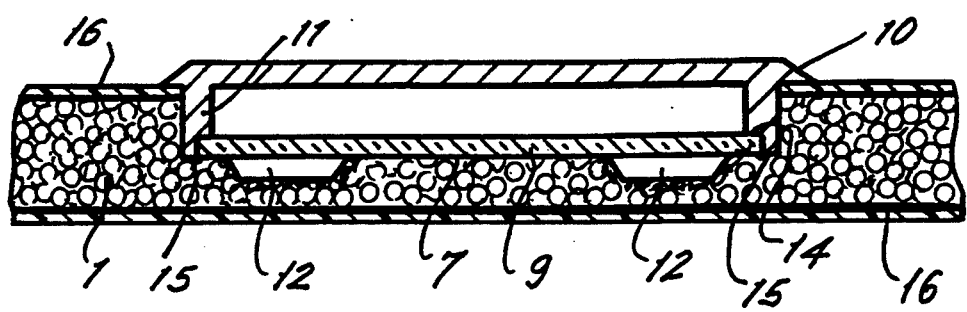
FIG. 2 is a section along the line 2—2 of FIG. 1.
Figure 3:
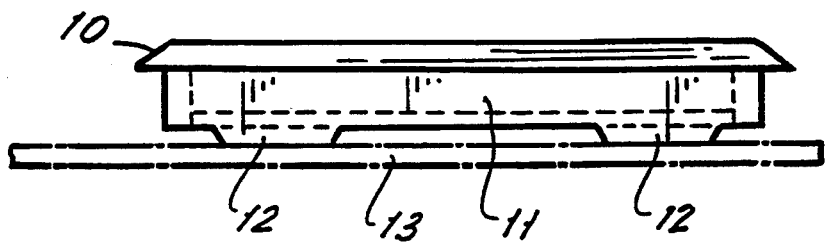
FIG. 3 shows a detail of the sun visor.

The frame 8 and the mirror 9 are together connected to the sun visor body 1 at the free web edge and the web extensions. Preferably, a sealing mandrel 13, indicated in FIG. 3 in dash-dot line, or other heat applicator is applied against the web extensions 12 in order to heat and partially melt or soften them. Immediately after removal of the sealing mandrel 13, the permanent mirror 9 is placed beneath the free web edge of the frame, and the frame 8 is then inserted into and pressed into the bottom of the depression 7 of the sun visor body 1, fusing the free end region or web edge or at least the extensions 12 to the material of the visor body at the bottom of the depression. The fusion is caused by the application of heat to the free end region of the web followed by its being pressed into the bottom of the depression and trapping the mirror 9 in place. In the connection region, as shown in FIG. 2, the particles of the sun visor body 1 are shown compacted in the vicinity of that fusion.

The web 11 of the frame 8 has in its free end region a circumferential, step shaped shoulder 14 which surrounds the mirror and against which the periphery of the mirror 9 rests. The extensions 12 are on the web free edge outward of the mirror 9. The mirror 9 is attached to the frame 8 by the partial displacement of the material of the frame, and particularly the web of the frame at the free end region or web edge, and more particularly the extension 12, which displacement is produced by the application of both heat and pressure to the free web edge and/or also to the web extensions for this purpose. The free web edge or extensions are displaced toward and/or to partially wrap over the rear edge of the mirror. The attachment points are indicated by reference numeral 15.

In a modification, rather than providing a separate initially applied and then removed sealing mandrel 13, the permanent mirror 9 may be first heated, then applied at the shoulder 14 of the web, and then the softened web edge is pressed into the bottom of the depression, which both fuses the web to the visor body and deforms the web free end region and the extensions 12 to securely engage the mirror at the rear side and around its edge.

Although the present invention has been described in relation to a particular embodiment, many other variations and modifications and other uses will become apparent to those skilled in the art. It is preferred, therefore, that the present invention be limited not by the specific disclosure herein, but only by the appended claims.

What is claimed is:

1. A sun visor for a vehicle, comprising:
    a sun visor body which is comprised of polypropylene particle foam; the body having a broad side, and a depression defined in the broad side in which a mirror is located;
    a mirror frame for the mirror and the frame being comprised of polypropylene, the frame being located in the depression and fused to the sun visor body so as to be integrally connected therewith.

2. The sun visor of claim 1, wherein the frame is developed as an injection molding.

3. The sun visor of claim 1, further comprising a mirror inserted in the frame.

4. The sun visor of claim 3, wherein the mirror is disposed in the depression and beneath the frame.

5. The sun visor of claim 1, wherein the frame includes a flange which rests against the sun visor body around the outside of the depression and a web which extends into the depression and the web engages and is integrally connected with the visor body.

6. The sun visor of claim 5, wherein the flange extends around the circumference of the depression and the web also extends around the circumference of the depression.

7. The sun visor of claim 5, wherein the web has web extensions which are pressed into the bottom of the depression and are fused with the material of the sun visor.

8. The sun visor of claim 5, wherein the web has web extensions which are pressed into the bottom of the depression after prior heating.

9. The sun visor of claim 5, wherein the web extends approximately perpendicular to the flange.

10. The sun visor of claim 5, wherein the web has a free end region toward the bottom of the depression and a circumferential, step shaped shoulder defined in the free end region against which the mirror rests.

11. The sun visor of claim 10, wherein the mirror is attached to the frame by partial displacement of the material of the free end region of the frame toward the mirror.

12. The sun visor of claim 11, wherein the displacement of the material of the frame is caused by the application of heat and pressure thereto.

13. A sun visor for a vehicle comprising:
    a sun visor body which is comprised of a fusible particle foam material; the body having a broad side, and a depression defined in the broad side into which a mirror is inserted;
    a mirror frame for the mirror and the frame is comprised of a material fusible with the foam material of the visor body, the frame being inserted into the depression and integrally connected with the sun visor body by the respective materials of the body and the frame being fused.

14. A method of providing a mirror in a sun visor body comprising:
    providing a visor body of polypropylene foam material with a depression in one side for receiving a mirror frame;
    providing a mirror frame of polypropylene, the frame including a web for being inserted into the depression and the web including a free end region for extending down to the bottom of the depression;
    heating the free end region of the web for enabling fusing thereof to the visor body;
    installing the mirror on the frame; and
    inserting the frame web into the visor body depression and pressing the free end region of the web against the bottom of the depression for fusing the material of the web to the material of the visor body.

15. The method of claim 14, wherein the insertion of the frame web is further for deforming the material of the free end region of the web around the edge of the mirror.

16. The method of claim 14, comprising the initial steps of forming the visor body of polypropylene particle foam, and forming a depression in a side of the visor body; and
    forming the mirror frame of polypropylene.

17. A sun visor produced according to the method of claim 16.

18. A sun visor produced according to the method of claim 15.

19. A sun visor produced according to the method of claim 14.

* * * * *